(12) United States Patent
Josefsson et al.

(10) Patent No.: US 12,629,883 B2
(45) Date of Patent: May 19, 2026

(54) PROCESS FOR MANUFACTURING A BOARD ELEMENT COMPRISING CAVITIES

(71) Applicant: Ceraloc Innovation AB, Viken (SE)

(72) Inventors: Per Josefsson, Ramlösa (SE); Per Nygren, Ramlösa (SE)

(73) Assignee: CERALOC INNOVATION AB, Viken (SE)

( * ) Notice: Subject to any disclaimer, the term of this patent is extended or adjusted under 35 U.S.C. 154(b) by 38 days.

(21) Appl. No.: 18/425,012

(22) Filed: Jan. 29, 2024

(65) Prior Publication Data

US 2024/0253295 A1     Aug. 1, 2024

(30) Foreign Application Priority Data

Jan. 30, 2023    (SE) ..................................... 2350085-3
Dec. 20, 2023    (SE) ..................................... 2351468-0

(51) Int. Cl.
| | |
|---|---|
| *B29C 59/04* | (2006.01) |
| *B29D 99/00* | (2010.01) |
| *B29C 48/00* | (2019.01) |
| *B29K 101/12* | (2006.01) |
| *B29L 31/00* | (2006.01) |

(52) U.S. Cl.
CPC ............ *B29C 59/04* (2013.01); *B29D 99/001* (2013.01); *B29C 48/0011* (2019.02); *B29K 2101/12* (2013.01); *B29K 2905/00* (2013.01); *B29L 2031/776* (2013.01)

(58) Field of Classification Search
None
See application file for complete search history.

(56) References Cited

U.S. PATENT DOCUMENTS

| | | | |
|---|---|---|---|
| 4,128,369 A | * | 12/1978 | Kemerer ............... B29C 48/001 |
| | | | 425/371 |
| 4,225,374 A | | 9/1980 | Kaufmann |
| 4,290,248 A | | 9/1981 | Kemerer |
| 5,133,922 A | | 7/1992 | Kaeufer |
| 8,431,054 B2 | | 4/2013 | Pervan |

(Continued)

FOREIGN PATENT DOCUMENTS

| | | |
|---|---|---|
| CN | 111946009 A | 11/2020 |
| CN | 113389343 A | 9/2021 |

(Continued)

OTHER PUBLICATIONS

U.S. Appl. No. 19/070,628, Darko Pervan, filed Mar. 5, 2025.

(Continued)

*Primary Examiner* — Mohammad M Ameen
(74) *Attorney, Agent, or Firm* — Boone IP Law

(57)     ABSTRACT

A process for manufacturing a board element including a plurality of cavities in a rear side thereof. The process includes displacing a substrate including a thermoplastic material in a feeding direction towards a pressing area of an impression device including a plurality of protruding impression elements and creating the cavities in a rear side of the substrate by impressing a substrate portion in the pressing area by the impression device, thereby obtaining the board element. An upstream thickness of the substrate upstream of the impression device exceeds a gap height of the pressing area during at least a part of an impression cycle.

20 Claims, 7 Drawing Sheets

(56)                    References Cited

U.S. PATENT DOCUMENTS

| | | | |
|---|---|---|---|
| 10,328,680 | B2 | 6/2019 | Pervan |
| 2019/0263101 | A1 | 8/2019 | Pervan |
| 2020/0199886 | A1 | 6/2020 | Van et al. |
| 2020/0230901 | A1 | 7/2020 | Pricone |
| 2021/0102383 | A1* | 4/2021 | Josefsson ................... B32B 9/02 |
| 2021/0285231 | A1* | 9/2021 | Baert .................... E04F 13/142 |
| 2023/0018307 | A1 | 1/2023 | Hanning |

FOREIGN PATENT DOCUMENTS

| | | | |
|---|---|---|---|
| CN | 114228184 A | | 3/2022 |
| EP | 2062727 A1 | | 5/2009 |
| GB | 0995148 A | | 6/1965 |
| JP | 2006248125 A | | 9/2006 |
| JP | 2012 030 590 A | * | 2/2012 |
| WO | 97/28937 A1 | | 8/1997 |
| WO | 2013/032391 A1 | | 3/2013 |
| WO | 2014/007738 A1 | | 1/2014 |
| WO | 2020/180237 A1 | | 9/2020 |
| WO | 2021/018918 A1 | | 2/2021 |
| WO | 2021076046 A1 | | 4/2021 |
| WO | 2021/180882 A1 | | 9/2021 |
| WO | 2022/050891 A1 | | 3/2022 |
| WO | 2022/211704 A1 | | 10/2022 |
| WO | 2023/036989 A1 | | 3/2023 |
| WO | 2023249536 A1 | | 12/2023 |

OTHER PUBLICATIONS

International Search Report and Written Opinion mailed on Aug. 23, 2023, by the Swedish Patent and Registration Office (PRV) for Swedish Application No. PCT/SE2023/050596, 14 pages.

International Search Report and Written Opinion received for PCT Patent Application No. PCT/SE2023/051073, mailed on Nov. 9, 2023, 13 pages.

Official Action mailed on Mar. 10, 2023, by the Swedish Patent and Registration Office (PRV) for Swedish Applicatior No. 2250776-8, 8 pages.

Official Action mailed on Mar. 10, 2023, by the Swedish Patent and Registration Office (PRV) for Swedish Applicatior No. 2250777-6, 8 pages.

Swedish Search Report mailed on Apr. 6, 2023 by the Swedish Patent and Registration Office for Swedish Application No. 2251248-7.

International Search Report and Written Opinion received for PCT Patent Application No. PCT/SE2024/050073, mailed on Apr. 19, 2024, 14 pages.

Swedish Official Action and Search Report mailed on Sep. 12, 2023, by the Swedish Patent and Registration Office for Swedish Application No. 2350085-3, 9 pages.

U.S. Appl. No. 18/991,969, Darko Pervan, filed Dec. 23, 2024.

U.S. Appl. No. 18/628,988, Per Josefsson, filed Apr. 8, 2024.

U.S. Appl. No. 19/197,432, Per Josefsson, filed May 2, 2025.

U.S. Appl. No. 18/946,258, Per Josefsson, filed Nov. 13, 2024.

U.S. Appl. No. 17/463,902, Per Josefsson, filed Sep. 1, 2021.

U.S. Appl. No. 17/705,465, Per Josefsson, filed Mar. 28, 2022.

U.S. Appl. No. 17/812,281, Darko Pervan, filed Jul. 13, 2022.

U.S. Appl. No. 17/831,826, Per Josefsson, filed Jun. 3, 2022.

U.S. Appl. No. 18/055,473, Per Josefsson, filed Nov. 15, 2022.

U.S. Appl. No. 18/209,359, Per Josefsson, filed Jun. 13, 2023.

U.S. Appl. No. 18/209,667, Per Josefsson, filed Jun. 14, 2023.

U.S. Appl. No. 18/210,429, Per Josefsson, filed Jun. 15, 2023.

U.S. Appl. No. 18/240,192, Darko Pervan, filed Aug. 30, 2023.

U.S. Appl. No. 18/295,559, Darko Pervan, filed Apr. 4, 2023.

U.S. Appl. No. 18/495,918, Per Josefsson, filed Oct. 27, 2023.

* cited by examiner

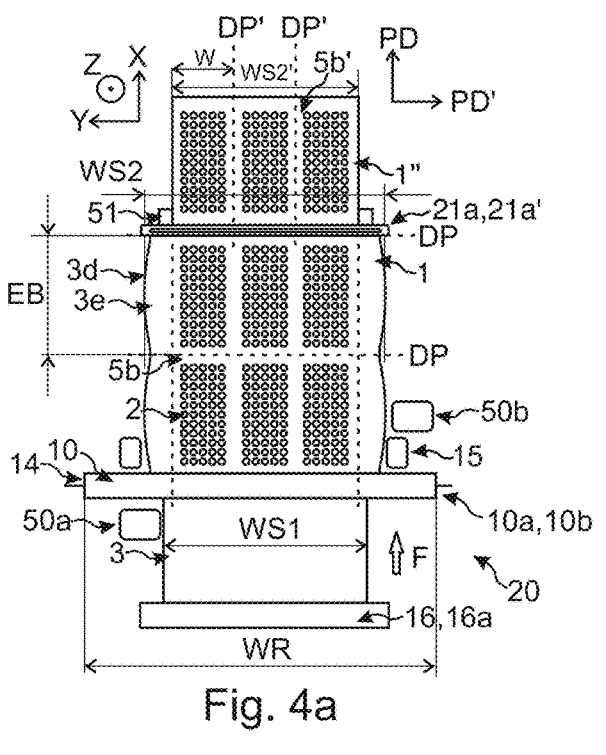
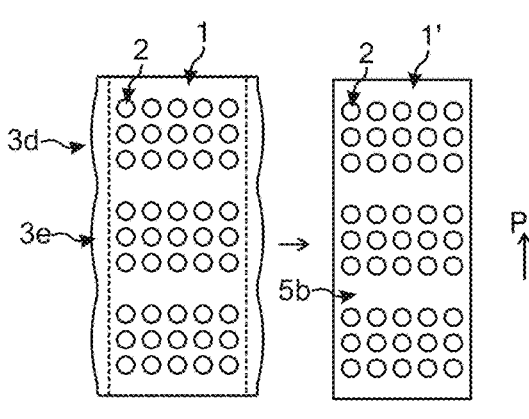
Fig. 4a
Fig. 4b
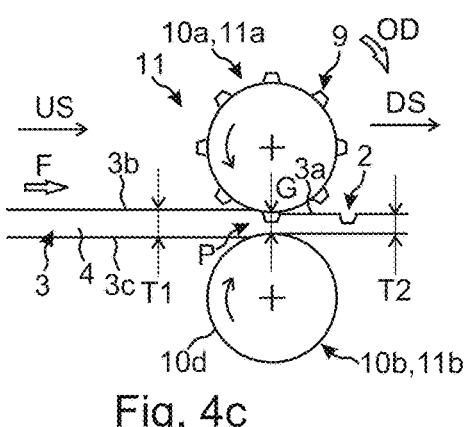
Fig. 4c
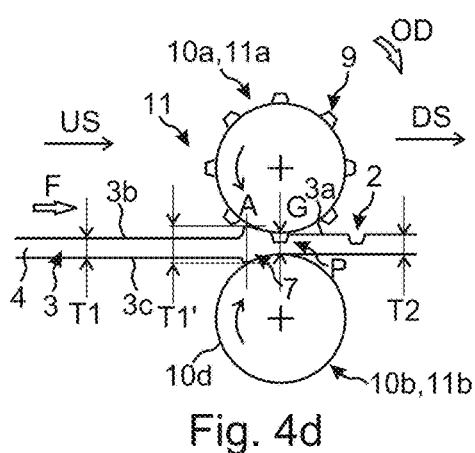
Fig. 4d
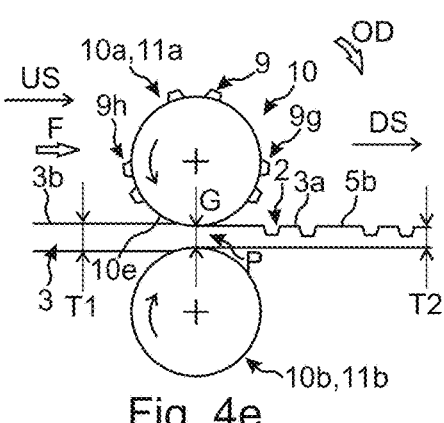
Fig. 4e
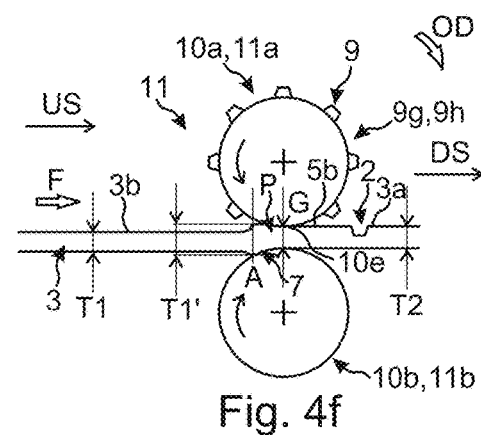
Fig. 4f

PROCESS FOR MANUFACTURING A BOARD ELEMENT COMPRISING CAVITIES

CROSS REFERENCE TO RELATED APPLICATIONS

The present application claims the benefit of Swedish application no. 2350085-3, filed on Jan. 30, 2023, and of Swedish application no. 2351468-0, filed on Dec. 20, 2023. The entire contents of each of Swedish application no. 2350085-3 and Swedish application no. 2351468-0, are hereby incorporated herein by reference in their entirety.

TECHNICAL FIELD

The disclosure generally relates to a process for manufacturing a board element comprising a plurality of cavities in a rear side thereof. More specifically, the cavities are created by means of impression. The board element may be formed from a substrate comprising a thermoplastic material. The panel may be a building panel, floor panel, wall panel, ceiling panel or furniture component.

BACKGROUND

The disclosure WO 2023/249536 A1 describes processes for manufacturing a board element comprising cavities in a rear side of the board element by means of impression. By means of these cavities, the weight of the board element may be reduced by relocating material, preferably when the substrate from which the board element is formed is disposed at an elevated temperature.

However, at least in some applications the manufacturing process needs to be improved. One such improvement is desired when a board element comprising impressed cavities is configured to be divided into panels.

SUMMARY

It is therefore an object of at least embodiments of the present disclosure to provide a more controlled process for manufacturing a board element comprising cavities, while ensuring that the characteristics of the board element are maintained or even improved.

Another object of at least embodiments of the present disclosure is to provide a more controlled process for manufacturing a board element comprising cavities and a separation portion functioning as a dividing portion of the board element or a strengthening board area.

These and other objects and advantages that will be apparent from the description have been achieved by the various aspects, embodiments and examples described below.

In accordance with the disclosure, there is provided a process for manufacturing a board element comprising a plurality of cavities in a rear side of the board element. The process comprises displacing a substrate comprising a thermoplastic material in a feeding direction towards a pressing area of an impression device comprising a plurality of protruding impression elements, and creating the cavities in a rear side of the substrate by impressing a substrate portion in the pressing area by the impression device, and obtaining the board element. An upstream thickness of the substrate upstream of the impression device exceeds a gap height of the pressing area during at least a part of an impression cycle.

The cavities may reduce the weight of the board element. In accordance with the present disclosure, thermoplastic material may be fed to the impression device at a sufficiently high rate for creating cavities and preferably said separation portion in the board element, while ensuring well-defined characteristics, such as dimensions, of the board element. In particular, a uniform board thickness may be provided. The feeding of thermoplastic material is achieved by letting the upstream thickness of the substrate exceed the gap height of the pressing area of the impression device during at least a part of an impression cycle. Indeed, a sufficient amount of material, or even more material than needed, for manufacturing the board element comprising the cavities may thereby be fed to the impression device. Also, a sufficient amount of material for forming the separation portion may be provided. The redundant material may subsequently be removed from the board element as will be described elsewhere herein. In view of the above, cavities and preferably a separation portion, may be created in the board element in a more controlled manner.

The gap height of the pressing area may be a maximal distance in the pressing area, preferably at a location away from, such as between, the impression elements.

The impression cycle may be a time period during which at least a subset of the cavities, such as all of the cavities of a board element, are created.

Generally herein, the impression device may comprise an impression member and a mating member between which the substrate may be fed, and the cavities created.

The substrate may be hardened or cured for forming at least a part of the board element, preferably a core thereof. Generally herein, by creating the cavities in the substrate, the board element may thereby be obtained.

The substrate may be free of cavities upstream of the impression device.

Throughout the present disclosure, the wording "cavity" may be construed as a recess, groove, depression, notch, indentation, cut, etc. The cavities may be open towards the rear side.

A hardened or cured substrate may provide a core of the board element. Optionally, a décor structure, such as a decorative layer and/or a wear layer, may be attached, such as laminated or adhered, to a front side of the substrate or core. The decorative layer may be a print layer.

The thermoplastic material may comprise thermoplastic polymers, such as polyvinyl chloride, PVC, polyethylene, PE, polypropylene, PP, thermoplastic polyurethane, TPU, or polyethylene terephthalate, PET, ethylene-vinyl acetate, EVA, polyamide, PA, polystyrene, PS, polyvinyl acetate, PVAc, polymethyl methacrylate, PMMA, polyvinyl butyral, PVB, polycarbonate, PC, acrylonitrile butadiene styrene, ABS, polyacrylamide, PAM, polybutylene terephthalate, PBT, chlorinated PVC, CPVC, or a combination thereof. Generally herein, the thermoplastic material may comprise amorphous polymers and/or semi-crystalline polymers.

The thermoplastic material may comprise a, preferably inorganic or organic, filler. A degree of filler may exceed 40 wt %, preferably exceeding 60 wt %, such as 50-90 wt % or 60-80 wt %.

The filler may comprise, or may be, an inorganic filler, such as a mineral material, for example calcium carbonate ($CaCO_3$), limestone, such as chalk, talc, fly ash, or a stone material, such as stone powder.

The filler may comprise, or may be, an organic filler, such as a wood material, a bamboo material, cork or rice husks. For example, the wood material may be wood fibres and/or wood dust, and the bamboo material may be bamboo dust.

An amount of thermoplastic polymers, such as PVC, may be 10-40 wt %, such as 15-35 wt %.

The core may be a rigid core. A degree of plasticizer in the core may be less than 5 wt %, preferably less than 3 wt % or less than 1 wt %. The core, such as the rigid core, may have a modulus of elasticity, or Young's modulus E, of 1-10 GPa, such as 2-8 GPa, preferably determined in accordance with ISO 178:2010/A1:2013.

The board element or panel herein may be a Luxury Vinyl Tile (LVT tile), a Stone Plastic (Polymer) Composite panel or Solid Polymer Core panel (SPC panel), or an Expanded Polymer Core panel (EPC panel), also known as Water Proof Core panel or Wood Plastic Composite panel (WPC panel).

The impression elements may be rigid. By being rigid, the impression elements may have a modulus of elasticity, or Young's modulus E, exceeding 3 GPa, such as from above 3 to 10 GPa, exceeding 10 GPa, such as from above 10 to 30 GPa, or even exceeding 30 GPa, such as from above 30 to 650 GPa. For example, any of these bounds on the modulus of elasticity may be applicable when the impression elements comprise a, preferably nonmetallic, inorganic material or a polymer-based material. In some embodiments, e.g., when the impression elements comprise a metal-based material, the modulus of elasticity, or Young's modulus E, may exceed 50 GPa, such as from above 50 to 100 GPa, exceeding 100 GPa, such as from above 100 to 175 GPa, or even exceeding 175 GPa, such as from above 175 to 650 GPa. By having rigid impression elements, more well-defined dimensions, such as a thickness, of the board element may be provided.

The rigid impression elements may comprise a metal-based material, a, preferably nonmetallic, inorganic material, or a polymer-based material, such as a thermosetting resin or a thermoplastic material.

The upstream thickness of the substrate may provide a material buffer of the impression device and/or the substrate may comprise a material buffer upstream of the impression device, wherein the material buffer is configured to feed thermoplastic material to the pressing area. Preferably, a shape of the material buffer varies during the impression cycle. By means of the material buffer, only a part of the thermoplastic material of the substrate may be allowed to be fed through the pressing area, while another part may be temporarily stored in the material buffer and configured to be subsequently fed to the pressing area.

A thickness of the material buffer may exceed a downstream thickness of the substrate.

The upstream thickness of the substrate may be substantially constant. Thereby, since the upstream thickness exceeds the gap height, a substantially constant addition of thermoplastic material may be fed to the impression device. For example, the substrate may be provided in the form of a sheet having a substantially constant cross-section.

The impression device may comprise at least one roller. The at least one roller may comprise the impression elements. Thereby, the process for manufacturing a board element may be more easily implemented in a continuous process, such as for forming SPC panels, which typically utilize a plurality of rollers.

The at least one roller may comprise a rigid roller comprising rigid impression elements. For example, the rigid roller may be an engraved roller. Preferably, the rigid roller comprises a metal-based material, such as cast iron, steel, aluminum, or hard metal. For example, the metal-based material may comprise at least 80 wt % or at least 90 wt % metal, such as exclusively comprising metal.

The, preferably rigid, impression elements may be provided on a separate lining member arranged on a roller. Thereby, the impression elements may be part of the separate lining member and may be replaced more easily, for example when they become worn. In addition, it may be easier to vary the characteristics, such as the designs, patterns and sizes, of the impression elements. The separate lining member may comprise a metal-based material, a, preferably nonmetallic, inorganic material or a polymer-based material, such as a thermosetting resin or a thermoplastic material.

The separate lining member may be arranged around an entire perimeter of the roller.

All of the impression elements of one of the at least one roller may be rotationally fixed to the one of the at least one roller during operation of the one of the at least one roller.

A width of the at least one roller may exceed an upstream width of the substrate. A full width of the substrate, including edge portions thereof, may thereby be pressed between an impression member and a mating member in the form of rollers, even if a downstream thickness of the substrate exceeds the upstream thickness of the substrate. Hence, more defined edge portions may be provided, which may be more easily further processed, such as cut. Preferably, the impression device, such as the rollers, is sidewardly open. Thereby, a width of the substrate may be allowed to increase during the impression.

The impression device may comprise an impression press plate provided with a structured surface comprising the, preferably rigid, impression elements. The impression press plate may be provided in a continuous press, such as a double-belt press.

In some embodiments, a downstream thickness of the substrate does not exceed the upstream thickness of the substrate. Preferably, the upstream thickness is determined upstream of a material buffer, when such is included in the substrate. Preferably, the downstream thickness is smaller than the upstream thickness.

In some embodiments, a downstream thickness of the substrate may exceed an upstream thickness of the substrate.

The process may further comprise forming the substrate under heat, preferably under pressure and/or by (co-)extrusion of an extrudate. Optionally, the process may further comprise calendering the extrudate from a (co-)extruder by at least three rollers, such as four or five rollers. By "(co-)extrusion" is throughout the disclosure meant extrusion (single layer) in an extruder or coextrusion (at least two layers) in a co-extruder. Herein, an extruder or a co-extruder may be shortened as "(co-)extruder" or sometimes only "extruder".

The step of creating the cavities may comprise relocating thermoplastic material of an upstream substrate section in a lateral direction, such that a downstream width of the substrate increases by at least 2%, preferably at least 5%, more preferably at least 10%. By laterally relocating the thermoplastic material in such a manner, cavities having a substantial interior volume may be created. The lateral relocation may occur towards one, or optionally both, of the edge portions of the substrate. In said optional scenario, the thermoplastic material may be relocated in two opposing lateral directions. The upstream substrate section may be a section of the substrate in which at least one cavity, such as a plurality of cavities, is configured to be created. Preferably, the upstream substrate section includes an entire upstream width of the substrate. It is clear that the creation of the cavities also may comprise relocating thermoplastic material along and against the feeding direction. Additionally, the creation of the cavities may comprise relocating thermoplastic material vertically, such as upwards and/or downwards. For example, a downstream thickness of the substrate may increase by at least 2%, preferably at least 5%, more preferably at least 10%, as compared to an upstream thickness of the substrate.

The impression elements may be shaped such that a flow of the thermoplastic material is at least partially directed in a lateral direction. Generally herein, the lateral direction may be perpendicular to the feeding direction, preferably being directed towards edge portions of the substrate.

The impression elements may each comprise an inclined or curved distal or outer wall for at least partially directing a flow of the thermoplastic material in a lateral direction. Alternatively, or additionally, the impression elements may each have a first boundary portion shaped for at least partially directing a flow of the thermoplastic material in a lateral direction, and optionally a second boundary portion for reducing a flow of the thermoplastic material in an opposing lateral direction.

A first and a second set of impression elements may be separated from each other along a separation direction by a blank portion, wherein a distance between the impression elements along the separation direction between the first and the second sets is larger than a distance between the impression elements within each of the first and the second sets. The blank portion may be free of any impression elements, for example being a smooth surface. However, the blank portion may optionally comprise embossing elements, preferably being smaller than the impression elements, such as being 50%, preferably 70%, more preferably 90% smaller than the impression elements in height and/or extension. The separation direction may be substantially parallel with the feeding direction at least during a part of the impression cycle. A separation direction of an impression member in the form of a roller may extend along and/or transverse to a rotational direction of the roller. By means of the blank portion, cavities may be created in the board element that are separated by a separation portion, which may function as a dividing portion of the board element or a strengthening board area.

An upstream feeding speed of the substrate upstream of the impression device may exceed a downstream feeding speed of the substrate downstream of the impression device. Thereby, more material may be fed to the impression device, e.g., when it comprises a blank portion.

The process may further comprise adjusting the upstream thickness of the substrate such that it exceeds the gap height during at least a part of the impression cycle, and/or regulating the upstream feeding speed such that it becomes larger than the downstream feeding speed.

A depth of the cavities may be at least 0.10, preferably at least 0.20, or even at least one third, of a thickness of the substrate and/or of board element. Thereby, a weight of the substrate and/or the board element may be reduced significantly.

Generally, all terms used herein, such as in the claims, are to be interpreted according to their ordinary meaning in the technical field, unless explicitly defined otherwise. All references to "a/an/the [element, device, component, means, step, etc.]" are to be interpreted openly as referring to at least one instance of said element, device, component, means, step, etc., unless explicitly stated otherwise. Reference to one or a plurality of "at least one element", etc., may shortly be referred to as "the element(s)".

BRIEF DESCRIPTION OF THE DRAWINGS

The disclosure will in the following be described in connection to exemplary embodiments and in greater detail with reference to the appended exemplary drawings, wherein:

FIG. 4a illustrates in a top view an embodiment of an arrangement for manufacturing a board element comprising cavities and its use.

FIG. 4b illustrates in a bottom view an embodiment of a board element and an embodiment of the board element with cut edge portions.

FIGS. 4c-4f illustrate in side views embodiments of an impression device when creating cavities in the substrate.

DETAILED DESCRIPTION

Figure 1A:
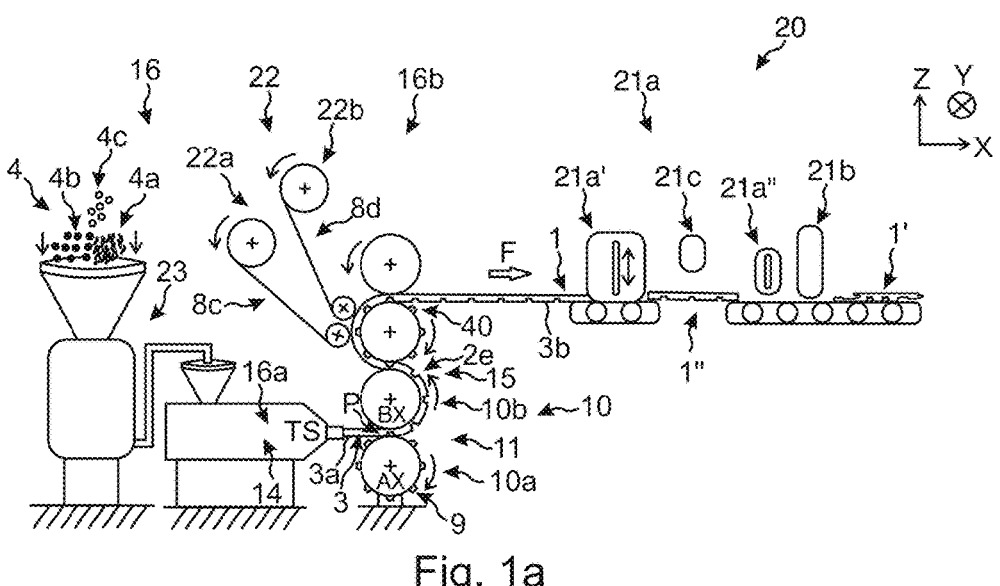
FIGS. 1a-1c illustrate in side views embodiments of an arrangement for manufacturing a board element comprising cavities and its use.
Figure 1B:
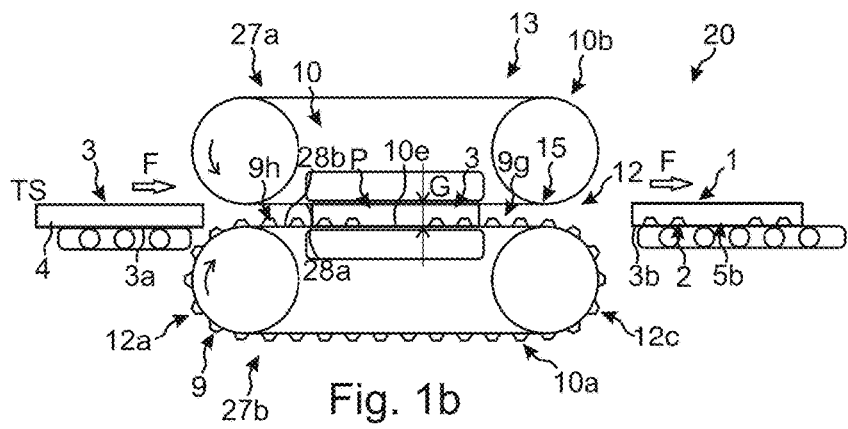
Figure 1C:
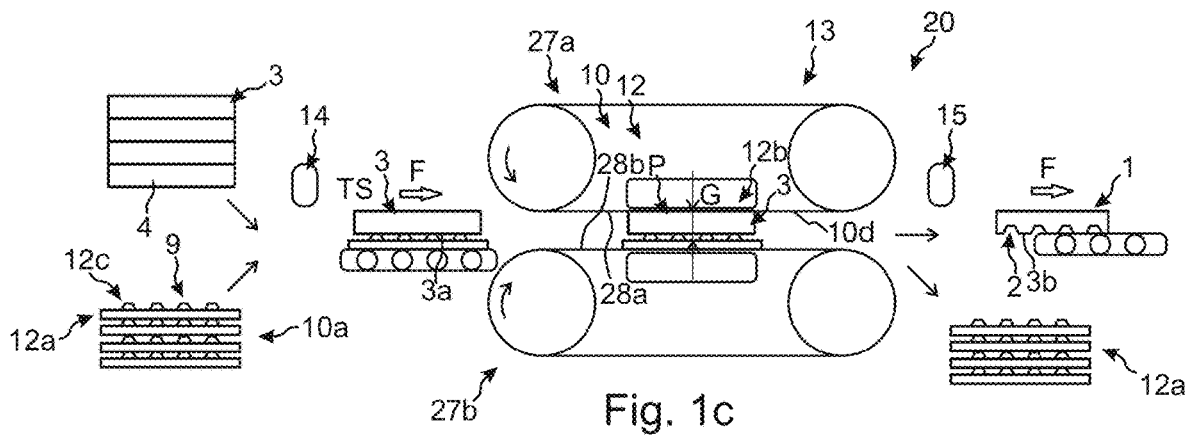
Figures 2A, 2B, 2C, 2D, 2E, 2F, 2G:
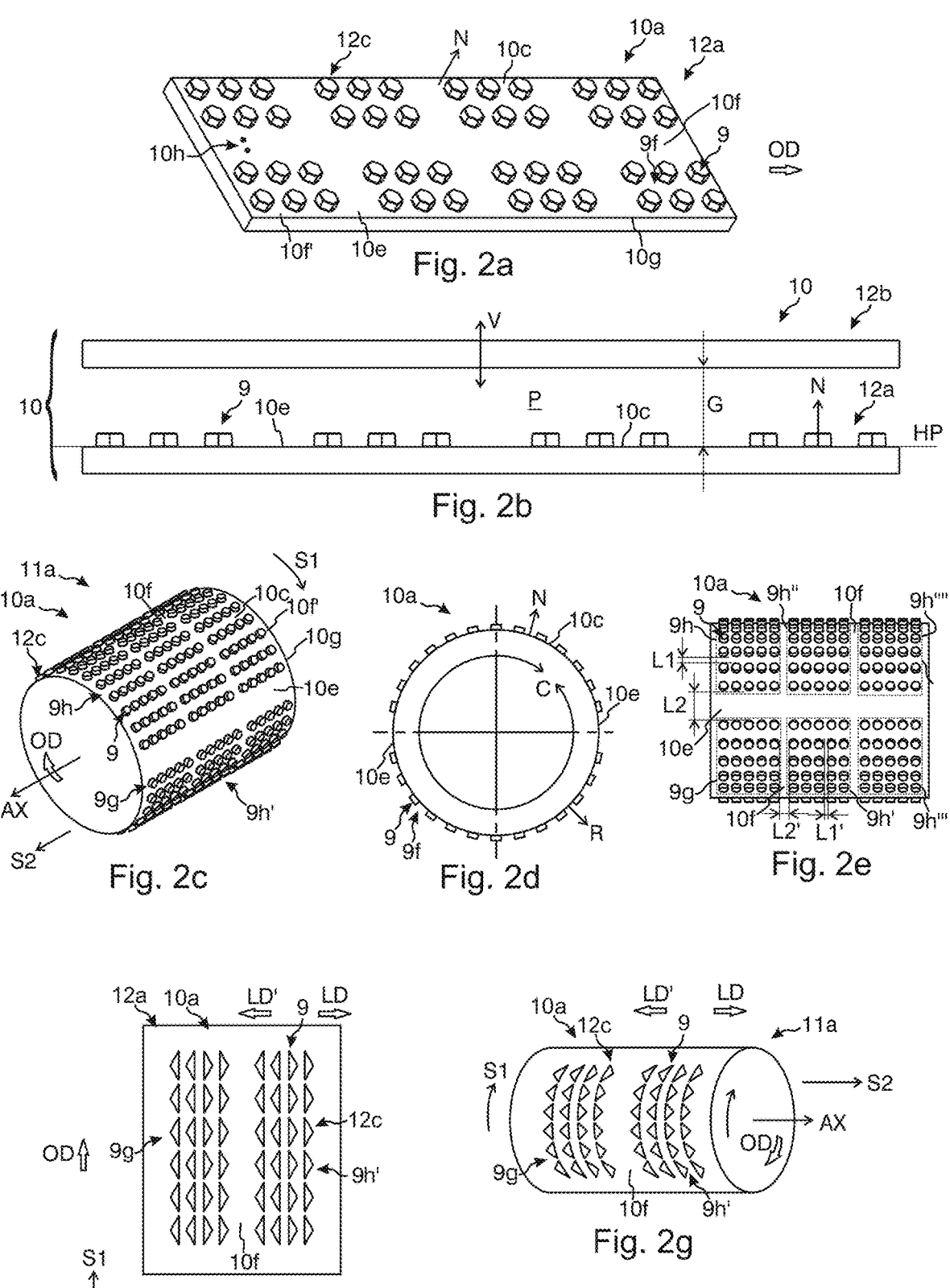
FIGS. 2a-2b illustrate an embodiment of an impression member in a perspective view (FIG. 2a) and an embodiment of an impression device comprising such an impression member in a side view (FIG. 2b).
FIGS. 2c-2e illustrate in a perspective view (FIG. 2c), a side view (FIG. 2d) and a front view (FIG. 2e) an embodiment of an impression member.
FIGS. 2f-2g schematically illustrate in a circumferential view or top view (FIG. 2f) and a perspective view (FIG. 2g) embodiments of an impression member.

Next, various embodiments of an arrangement 20 for manufacturing a board element 1 comprising cavities 2 in a rear side 5 of the board element, as well as embodiments of a related board element, will be described with reference to, e.g., FIGS. 1a-1c, 2a-2g, 3a-3g, 4a-4f, 5a-5g, 6a and 7a-7d. The arrangement 20 is configured to implement a process for manufacturing such a board element 1 from a substrate 3, cf. the embodiment in FIG. 6b. The board element 1 may be rectangular comprising long 1a, 1b (or 1c, 1d) and short 1c, 1$d$ (or 1$a$, 1$b$) edge portions, but other shapes of the board element, such as square, are equally suitable within the present disclosure.

The arrangement 20 extends in a longitudinal X, a transverse Y, and a vertical Z direction. As shown in, e.g., the embodiments in FIGS. 1$a$-1$c$, 4$a$ and 7$a$, the arrangement 20 comprises an impression device 10 comprising protruding impression elements 9. The impression device 10 may comprise an impression member 10$a$ and a mating member 10$b$. The impression elements 9 are provided on a base portion 10$c$ of the impression member 10$a$ and protrude therefrom in an overall normal direction N of the impression device 10, for example of the base portion 10$c$. A pressing surface 10$d$ of the mating member 10$b$ may be flat and/or smooth.

Preferably, the impression elements 9 are rigid. In a first example, the rigid impression elements comprise a metal-based material, such as cast iron, steel, aluminum, or hard metal. The modulus of elasticity, or Young's modulus E, may exceed 10 GPa, such as from above 10 to 50 GPa, exceeding 50 GPa, such as from above 50 to 100 GPa, exceeding 100 GPa, such as from above 100 to 175 GPa, or even exceeding 175 GPa, such as from above 175 to 650 GPa. In a non-restrictive example, the modulus of elasticity of steel may be 190-215 GPa. In a second example, the rigid impression elements 9 comprise an inorganic material, such as granite, ceramic material, or concrete. The inorganic material may be nonmetallic. The modulus of elasticity may exceed 10 GPa, such as from above 10 to 30 GPa, exceeding 30 GPa, such as from above 30 to 650 GPa. In a third example, the rigid impression elements 9 comprise a polymer-based material, such as a thermosetting resin, for example a phenolic resin, an epoxy resin, polyester, an amino resin, such as melamine formaldehyde resin, MF, or urea formaldehyde resin, UF, or a thermoplastic material, for example polyether ether ketone, PEEK, polyphenylene sulfide, PPS, polybenzimidazole, PBI, polyimide, PI, or polyoxymethylene, POM. The modulus of elasticity may exceed 3 GPa, for example from above 3 to 10 GPa, such as exceeding 10 GPa, for example from above 10 to 650 GPa. The thermoplastic material may be a high-temperature thermoplastic material.

The substrate 3 in which the cavities are to be created may be provided between, such as fed, between the impression 10$a$ and mating 10$b$ members. For example, the substrate may be conveyed on a conveyer, as pictured in FIG. 1$b$. During the creation of the cavities 2 in the substrate, the impression member 10$a$ and mating member 10$b$ may be configured to face a rear side 3$b$ and the front side 3$c$ of the substrate 3, respectively.

In some embodiments, as shown in, e.g., FIG. 1$a$, 2$c$-2$e$, 2$g$, 3$f$-3$g$, 4$a$, 4$c$-4$f$ and 7$a$-7$d$, the impression device 10 comprises at least one roller 11, each preferably being rotatably arranged in the arrangement 20. The impression 10$a$ and mating 10$b$ members may comprise an impression roller 11$a$ and a mating roller 11$b$, respectively. The impression roller 11$a$ may comprise the, preferably rigid, impression elements 9. All of the impression elements 9 may be rotationally fixed to the impression roller 11$a$ during operation of the impression roller 11$a$. The overall normal direction N may correspond to a radial direction R of the impression roller 11$a$, preferably being perpendicular to a circular base portion 10$c$. The rollers 11$a$ and 11$b$ may be rotatable around an axis AX and an axis BX, respectively, thereby defining a rotational direction thereof.

In some embodiments, the at least one roller 11 comprises a rigid roller in the form of an impression roller 11$a$ comprising the rigid impression elements 9. Preferably, the rigid roller comprises a metal-based material, such as cast iron, steel, aluminum, or hard metal, but other materials, such as any of the inorganic materials or polymer-based materials specified above are equally suitable within the present disclosure.

In some embodiments, and as shown in FIGS. 7$b$-7$d$, the, preferably rigid, impression elements 9 are provided on a separate lining member 11$c$ arranged on a roller 11. Preferably, the separate lining member 11$c$ is arranged around an entire perimeter of the roller 11. Such a combination may thereby form the impression roller 11$a$ and hence the impression member 10$a$. All of the impression elements 9 may be rotationally fixed to the impression roller 11$a$ during operation of the impression roller 11$a$. In a first example, the impression elements 9 are integrally formed with the separate lining member 11$c$. In a second example, the impression elements 9 are formed separately from the lining member 11$c$ and are attached to the separate lining member 11$c$. The separate lining member 11$c$, such as a carrier portion 11$e$ thereof and/or the impression elements 9 per se, may comprise any of the metal-based materials, preferably nonmetallic, inorganic materials, or polymer-based materials of the first, second, or third examples relating to the rigid impression elements 9 detailed above, whereby reference is made thereto. In addition, any of the elastic moduli specified in the examples above also are suitable for the separate lining member 11$c$, such as a carrier portion 11$e$ thereof and/or the impression elements 9 per se. The separate lining member 11$c$ may be configured to be attached to a circumference 11$f$ of the roller 11 (see FIGS. 7$c$-7$d$). FIG. 7$b$ illustrates a, preferably flexible, separate lining member 11$c$ configured to be wound around the roller 11 in the indicated directions RL. For example, end portions 11$d$ of the separate lining member 11$c$ may be joined along a joint seam, preferably extending along the axis AX of the roller 11$a$. Alternatively, the separate lining member 11$c$ may be circularly shaped and preferably rigid.

In some embodiments, as shown in, e.g., FIGS. 1$b$-1$c$, 2$a$-2$b$ and 2$f$, the impression device 10 may be arranged in a continuous press 13, such as a double-belt press. The impression device in FIGS. 2$a$-2$b$ and 2$f$ may form a part of, or may be used in, e.g., the arrangement 20 in FIG. 1$b$ or 1$c$. The impression device 10 may comprise a press plate assembly 12. The impression 10$a$ and mating 10$b$ members may comprise an impression press plate 12$a$ provided with a structured surface 12$c$, and a mating plate 12$b$, respectively. The structured surface 12$c$ may comprise protrusions in the form of impression elements 9 and intermediate lower portions 9$f$, such as depressions, provided therebetween. The impression elements 9 may be arranged in a pattern. For example, the structured surface 12$c$ may be part of an embossing plate. At least during a part of an impression cycle, the overall normal direction N may be perpendicular to a horizontal plane HP, preferably being provided along the base portion 10$c$. Optionally, the impression 10$a$ and mating 10$b$ members, such as the impression press plate 12$a$ and the mating plate 12$b$, may be relatively displaceable with respect to each other along a, preferably vertical, direction V.

The double belt-press may comprise an upper 27$a$ and a lower 27$b$ endless belt unit. The impression press plate 12$a$ may be provided as a portion of a belt 28$b$ of the lower 27$b$ (or upper 27$a$) endless belt unit, see, e.g., FIG. 1$b$. Moreover, the mating plate 12$b$ may be provided as a portion of a belt 28$a$ of the upper 27$a$ (or lower 27$b$) endless belt unit. In some embodiments, and as shown in FIG. 1$c$, the impression press plate 12*a* may be provided separately from the double-belt press. For example, the plates 12*a* in FIG. 2*a*-2*b* may be used.

The protruding impression elements 9 in any embodiment herein, such as in FIGS. 1*a*-1*c*, 2*a*-2*g*, 3*f*-3*g*, 4*a*, 4*c*-4*f* and 7*a*-7*d*, may be of frustro-conical form or semi-spherical form, or may be formed as a, preferably rectangular, parallelepiped, a polyhedron, a prismatoid, such as a prism, etc. FIGS. 2*f*-2*g*, 3*a*-3*c* and 3*e* illustrate that the impression elements 9 may be shaped such that a flow of the thermoplastic material 4 is at least partially directed in a lateral direction LD, LD' (further discussed below). For example, each may comprise an inclined or curved distal wall 9*a* and/or may each have a first boundary portion 9*b*, preferably being inclined with respect to an operational direction OD, such as a rotational direction, of the impression member 10*a*. The distal wall 9*a* may be inclined relative to the base portion 10*c* by an angle α, preferably being 0.5-35°, such as 1-10°. Such an inclination can advantageously provide a flow of the thermoplastic material 4 at least partially directed in the lateral direction LD, LD'. The first boundary portion 9*b* may be shaped as a circle segment or as polygon segments. Optionally, the impression elements 9 may each comprise a second boundary portion 9*c* for reducing a flow of the thermoplastic material 4 in an opposing lateral direction LD', LD. For example, the second boundary portion 9*c* may be straight (FIG. 3*e*) or curved/inclined inwards (FIG. 3*c*) with respect to the operational direction OD. The impression elements 9 may generally herein be tapering, preferably in a direction away from the base portion 10*c*, such as in the overall normal direction N.

Figure 3A:
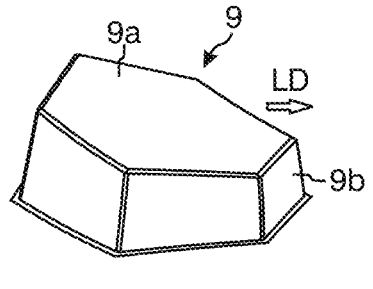
FIGS. 3a-3c illustrate in a perspective view (FIG. 3a) and in a side view (FIG. 3b) an embodiment of a protruding impression element, and in a perspective view (FIG. 3c) another embodiment of a protruding impression element.
Figure 3B:
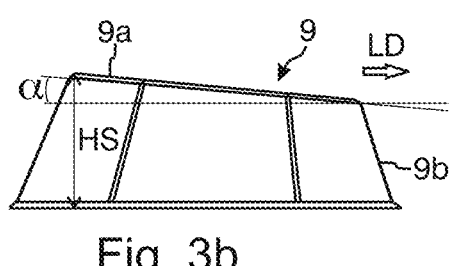
Figure 3C:
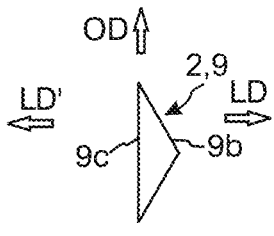

Extensions of the impression elements 9 along a pair of non-parallel, such as perpendicular, horizontal directions E1, E2 may be substantially the same, see, e.g., FIG. 3*c*. Generally herein, the horizontal extensions E1, E2 may be determined at the base of the impression element. Thereby, circumscribed cavities 2 may be created having extensions along a pair of non-parallel, such as perpendicular, horizontal directions D1, D2 that are substantially the same. For example, the cavities 2 may have a boundary shaped as a circle or a, preferably regular convex, polygon, such as a triangle, square, pentagon, hexagon, etc. The horizontal extensions E1, E2 may have components along the X and Y directions during impression.

Figure 3D:
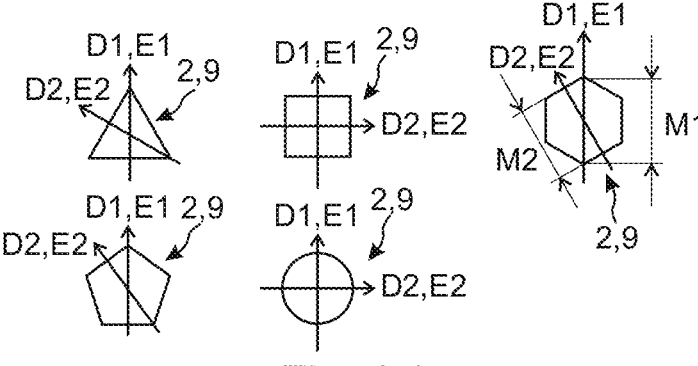
FIGS. 3d-3e illustrate in top views embodiments of examples of geometries of cavities and/or protruding impression elements.
Figure 3E:
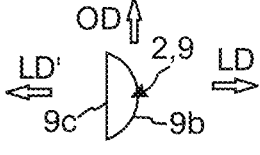
Figure 3F:
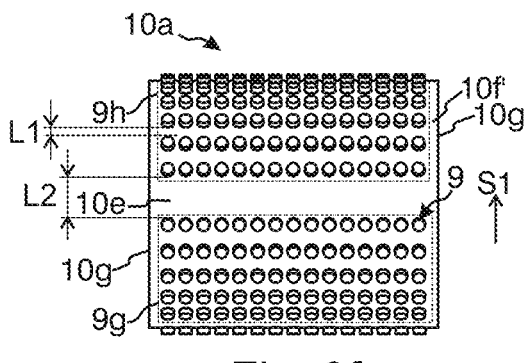
FIGS. 3f-3g illustrate in a front view (FIG. 3f) and a side view (FIG. 3g) an embodiment of an impression member.
Figure 3G:
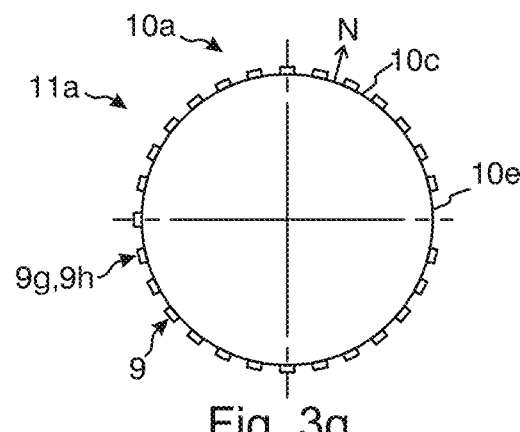

Generally herein, a form of the cavities 2 may correspond to a form of the impression elements 9, whereby their geometries may be represented as in FIGS. 3*d*-3*e* (see ref. no. 2).

As shown in, e.g., FIGS. 1*b*, 2*a*-2*g*, 3*f*-3*g*, 4*e*-4*f* and 7*a*-7*d*, a first 9*g* and a second 9*h* (or 9*h*') set of impression elements 9 may in some embodiments be separated from each other along a separation direction S1 (or S2) by a blank portion 10*e* (or 10*f*). A distance L2 (or L2') between the impression elements 9 along the separation direction S1 (or S2) between the first 9*g* and the second 9*h* (or 9*h*') sets is larger than a distance L1 (or L1') between the impression elements 9 within each of the first 9*g* and the second 9*h* (or 9*h*') sets. In non-limiting examples, L1 (or L1') may be 1-10 mm, preferably 1-5 mm, more preferably 1.5-4 mm and L2 (or L2') may be 5-100 mm, preferably 10-75 mm, more preferably 12-50 mm. The separation directions S1 and S2 may be parallel with and perpendicular to the operational direction OD, respectively.

In a first example, the impression member 10*a* comprises a first 9*g* and a second 9*h* set of impression elements 9 separated by a blank portion 10*e*. In a second example, the impression member 10*a* comprises a first 9*g* and a second

9*h*' set of impression elements 9 separated by a blank portion 10*f*. In a third example, the impression member 10*a* comprises a first 9*g* and a second 9*h* set of impression elements 9 separated by a blank portion 10*e* and a first 9*g* and a second 9*h*' set of impression elements 9 separated by a blank portion 10*f*. It is emphasized that in any of the examples above, there may be additional second sets 9*h*", 9*h*''', 9*h*'''' defined in a similar manner with respect to an adjacent "first" set 9*h*, 9*h*', 9*h*'', e.g., as shown in FIGS. 2*a*-2*e*. It is noted that when there is only one blank portion 10*e* on a periodic impression member 10*a*, such as an endless belt unit 27*b* or an impression roller 11*a*, e.g., as in FIGS. 1*b*, 3*f*-3*g* and 4*f*, the first 9*g* and second 9*h* set may be the same.

Preferably, the impression elements 9 described herein are spaced from an edge section 10*g* of the impression member 10*a* by a space 10*f*, such as in a direction perpendicular to the operational direction OD. Thereby, the cavities 2 may be provided in an interior 5*a* of the rear side 5 as described elsewhere herein.

Figure 7A:
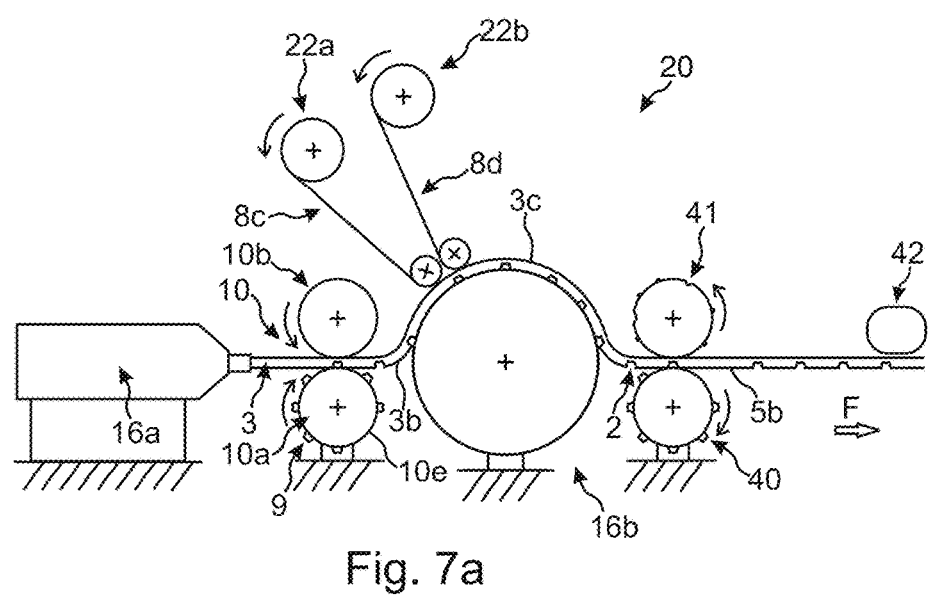
FIG. 7a illustrates in a side view an embodiment of an arrangement for manufacturing a board element comprising cavities and its use.
Figure 7B:
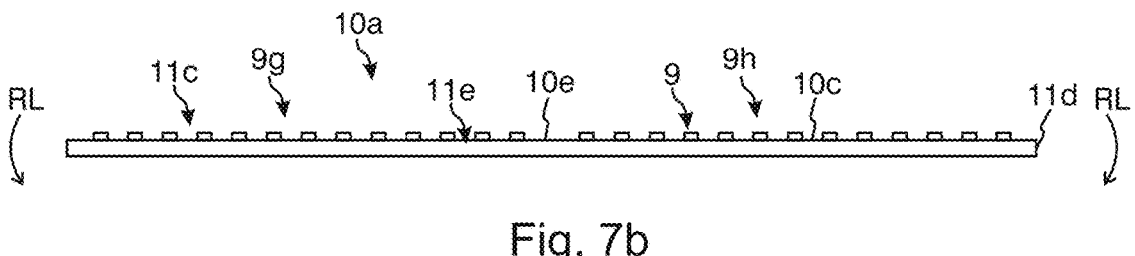
FIGS. 7b-7d illustrates in a side view an embodiment of a separate lining member (FIG. 7b) and in a perspective view (FIG. 7c) and a side view (FIG. 7d) an embodiment of such a separate lining member arranged on a roller.
Figure 7C:
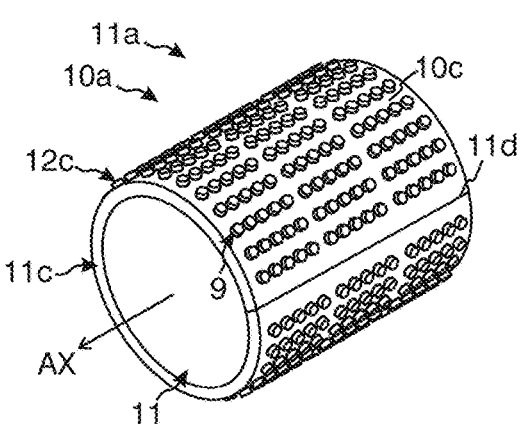
Figure 7D:
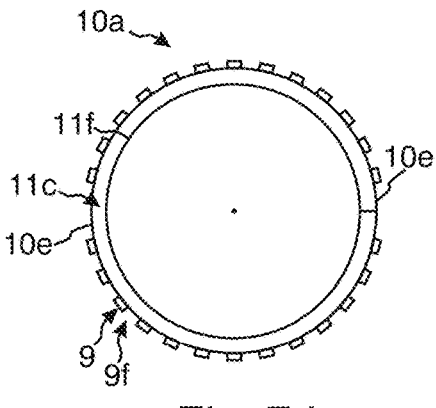

The arrangement 20 may comprise a substrate forming arrangement 16, preferably provided upstream from the impression device 10, see, e.g., FIGS. 1*a*, 4*a* and 7*a*. A hardened or cured substrate 3 may provide a core 8*a* of the board element 1. Optionally, the substrate 3 may comprise additional layers 8, for example obtained from a co-extruded substrate. The substrate forming arrangement 16 may comprise an extruder 16*a* (or a co-extruder) and, optionally a roller assembly 16*b* for calendering an extrudate from the extruder. The roller assembly 16*b* may comprise at least three rollers, such as four or five rollers. The extruder 16*a* may communicate with a material container 23 configured to receive a thermoplastic material 4 comprising thermoplastic polymers 4*a* and preferably a filler 4*b*, for example via a hopper. The thermoplastic material 4 may further comprise additives 4*c*, such as at least one of a stabilizer, a blowing agent or a foaming agent, a plasticizer, a colourant, pigments, a lubricant, an impact modifier, a processing aid, etc. Other features and characteristics of the substrate forming arrangement 16 have been described page 18, lines 1-16 and FIGS. 1*a*-1*c* in WO 2023/249536 A1 which content hereby is explicitly incorporated by reference.

The arrangement 20 may comprise a substrate heating device 14 and/or a cooling unit 15, see FIGS. 1*a*-1*c* and 4*a*. Features and characteristics appertaining thereto have been described page 18, line 17 to page 19, line 2 and FIGS. 1*a*-1*c* in WO 2023/249536 A1 which content is explicitly incorporated herein by reference.

In some embodiments, the substrate forming arrangement 16 may comprise a top layer roller arrangement 22 comprising a decorative layer 22*a* and/or a wear layer 22*b* roller arrangement for continuously laminating a décor structure 8*b*, such as a decorative layer 8*c* and/or a wear layer 8*d*, to the board element 1 after or during its forming. In some embodiments, the décor structure 8*b* may be formed by, preferably digitally, printing a print P' directly on the board element 1 or core 8*a* and optionally providing a wear layer 8*d* thereon, cf., e.g., FIG. 5*a*. In some embodiments, a backing layer 8*e*, such as a balancing layer, and/or a cover layer 8*f* may be attached, such as laminated or adhered, to a rear side of the substrate or core after creating the cavities 2.

As shown in, e.g., FIGS. 1*a* and 4*a*, but is suitable in any embodiment herein, the arrangement 20 may further comprise a board dividing device 21*a* and/or a profiling unit 21*b*. The board dividing device 21*a* may be configured to divide the board element 1 into at least one panel 1', such as at least two panels 1'. The profiling unit 21*b* may be configured to produce a locking device 6*a*, 6*b* on at least one edge portion $1a'$, $1b'$, $1c'$, $1d'$ of the board element 1 in the form of a panel 1' or at least two panels 1' into which the board element has been divided. For example, a locking device 6a and/or 6b may be produced on long $1a'$, $1b'$ and/or short $1c'$, $1d'$ edge portions, preferably by machining.

As illustrated in, e.g., FIGS. 1b-1c, 4b and 5a, in some embodiments, the manufactured board element 1 or panel 1' does not comprise a locking device. For example, they may be assembled in a loose-lay configuration, preferably in mutual abutment.

A gap between the impression member 10a and mating member 10b forms a pressing area P of the impression device 10. The gap height G may be a maximal distance between pressing components in the pressing area P, preferably at a location away from, such as between, the impression elements 9. The gap height G may be a maximal distance between the impression member 10a and the mating member 10b during operation of the impression device 10, cf. FIGS. 1b-1c, 2b and 4c-4f. Any of the embodiments in FIGS. 4c-4f are suitable in FIG. 1a, 4a or 7a.

The arrangement 20 may comprise thickness and/or width monitoring units 50a, 50b arranged upstream and downstream of the impression device 10. The upstream monitoring unit 50a preferably is arranged upstream of a location of a material buffer 7 of the substrate 3 discussed elsewhere herein and formed during operation of the arrangement 20.

Figure 6A:
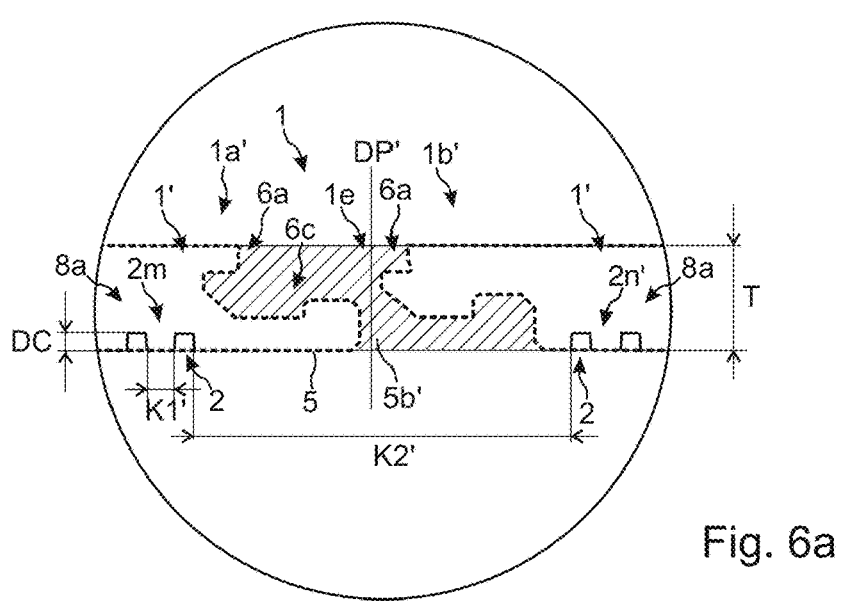
FIG. 6a illustrates an enlarged cross-sectional side view of the board element in FIG. 5f or 5g.
Figure 6B:
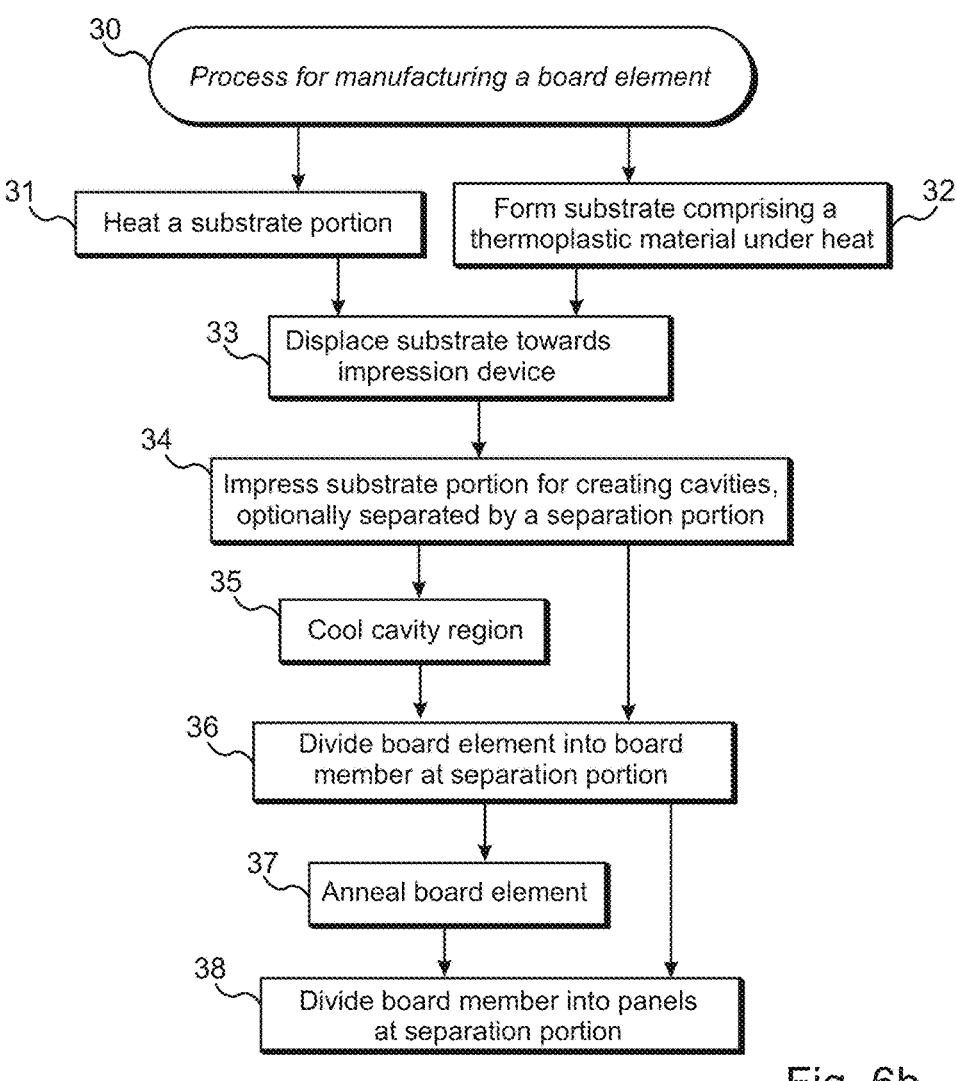
FIG. 6b illustrates a flow chart of an embodiment of a process for manufacturing a board element.

The arrangement 20 in, e.g., any of FIGS. 1a-1c, 2a-2g, 3a-3g, 4a, 4c-4f and 7a-7d, is configured to implement a process for manufacturing a board element 1 comprising cavities 2. The flow chart in FIG. 6b illustrates an embodiment of such a process (Box 30), although it is understood that variants of this embodiment are equally suitable within the present disclosure.

First, a substrate 3 comprising a thermoplastic material 4 is provided. The substrate 3 may be preformed and a substrate portion 3a thereof may be heated by a substrate heating device 14 (Box 31), such that the substrate portion 3a or even the entire substrate 3 becomes disposed at an elevated temperature TS. In some embodiments, the elevated temperature TS may be obtained during a forming of the substrate 3 under heat and, preferably, pressure (Box 32). For example, the substrate 3 may be at least partially formed in the substrate forming arrangement 16, such as in a (co-)extruder 16a or in a pressing device. Preferably, the extrudate is calendered in the roller assembly 16b by at least three rollers, such as four or five rollers. In any of the embodiments above, the elevated temperature TS may exceed 40° C., preferably being 40-295° C. The thermoplastic material 4 may soften, preferably melt, when it is heated and may harden when it is cooled.

The substrate portion 3a, preferably the entire substrate 3, may comprise a thermoplastic material 4 comprising thermoplastic polymers 4a, such as PVC, PE, PP, TPU, PET, EVA, PA, PS, PVAc, PMMA, PVB, PC, ABS, PAM, PBT, or CPVC, and a filler 4b. The filler 4b may comprise, or may be, an inorganic filler, such as a mineral material. When the thermoplastic material 4 comprises PVC, the elevated temperature TS may be 50-210° C., preferably 60-180° C. When the thermoplastic material 4 comprises PP, the elevated temperature TS may be 60-220° C., preferably 70-175° C. When the thermoplastic material 4 comprises PET, the elevated temperature TS may be 70-295° C., preferably 110-280° C.

Thereafter, the substrate 3 is displaced in a feeding direction F towards the pressing area P (Box 33) and the heated substrate portion 3a is impressed by the impression elements 9 (Box 34), thereby creating cavities 2 in a rear side 3b of the substrate 3. The creation may be implemented by any of the impression devices 10 disclosed herein, such as in any of FIGS. 1a-1c, 2a-2g, 3a-3g, 4a, 4c-4f and 7a-7d. Thereby, a board element 1 comprising cavities 2 in its rear side 5 may be obtained.

An impression cycle may be a time period during which at least a subset of the cavities 2, such as all of the cavities of a board element 1 or board member 1" or panel 1', are created. For example, the impression cycle may be a time period during which a first 9g and a second 9h (or 9h') set of separated cavities are created (see, e.g., below). An upstream thickness T1, T1' of the substrate 3 upstream of the impression device 10 herein exceeds a gap height G of the pressing area P during at least a part of the impression cycle, such as during the entire impression cycle.

The board element 1 may be thinner at the location of the cavities 2 than away from the cavities. A, preferably maximal, depth DC of the cavities 2, preferably from the rear side 3b, 5 to an innermost portion of the cavities 2, may be at least 0.10, at least 0.15, at least 0.20, or at least one third, of a, preferably maximal, thickness T of the substrate 3 and/or board element 1. Thereby, a weight of the substrate 3 and/or the board element 2 may be reduced significantly. For example, $0.10*T \leq DC \leq 0.70*T$, $0.20*T \leq DC \leq 0.70*T$, or $0.30*T \leq DC \leq 0.70*T$, such as $0.35*T \leq DC \leq 0.65*T$.

A first 9g and a second 9h (or 9h') set of impression elements 9 may be separated from each other by a blank portion 10e, 10f as described above (cf. Box 34). Thereby, as shown in, e.g., FIGS. 1b, 4a-4b, 4e-4f, 5a-5g, 6a and 7a, cavities 2 may be created in the board element 1, board member 1", or panel 1' that are separated by a separation portion 5b and/or 5b'. A first 2m and a second 2n (or 2n') group of cavities 2 may be separated from each other along one or two, preferably perpendicular, panel directions PD (or PD') by the separation portion 5b (or 5b'), preferably forming a continuous segment between opposing edge portions 1a, 1b and/or 1c, 1d (or $1a'$, $1b'$ and/or $1c'$, $1d'$ in case of a panel 1') along the panel direction(s) PD and/or PD'. Preferably, the panel directions PD and PD' is a longitudinal and a transverse direction of the board element, board member, or panel, respectively (or vice versa).

As shown in FIGS. 5c, 5f-5g and 6a, a distance K2 (or K2') between the cavities 2 along the panel direction PD (or PD') between the first 2m and the second 2n (or 2n') group may thereby be larger than a distance K1 (or K1') between the cavities within each of the first and the second groups 2m (or 2n). Moreover, it is stressed that the board element 1, board member 1", or panel 1' sometimes may comprise a plurality of such second 2n, 2n' groups along the panel direction(s) PD and/or PD'. In non-limiting examples, K1 (or K1') may be 1-10 mm, preferably 1-5 mm, more preferably 1.5-4 mm, and K2 (or K2') may be 5-100 mm, preferably 10-75 mm, more preferably 12-50 mm.

Figures 5A, 5B, 5C, 5D, 5E, 5F, 5G:
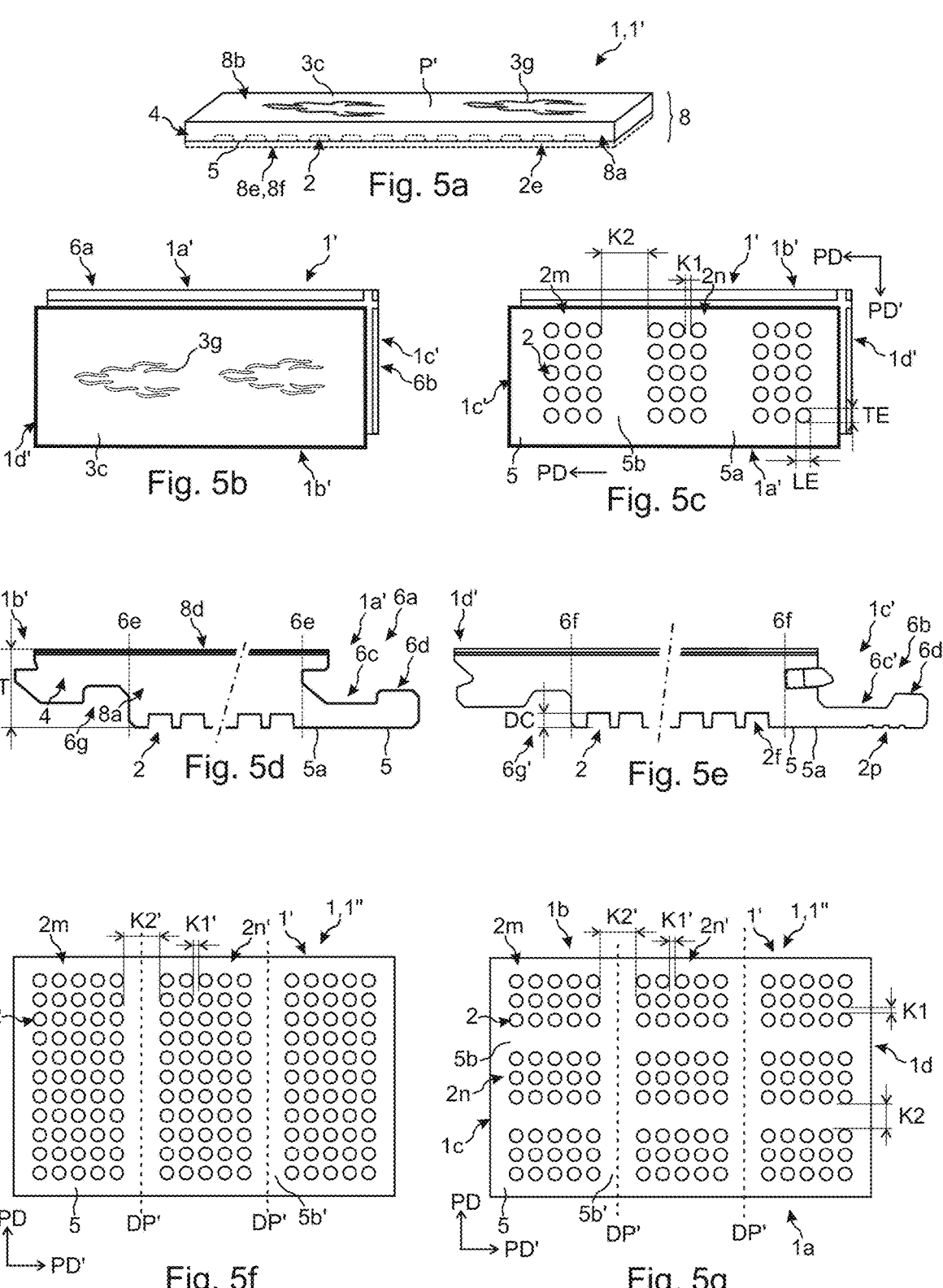
FIGS. 5a-5e illustrate in a perspective view (FIG. 5a) an embodiment of a board element or panel, and in a top view (FIG. 5b), a bottom view (FIG. 5c) and cross-sectional side views (FIGS. 5d-5e) another embodiment of a board element or panel.
FIGS. 5f-5g illustrate in bottom views embodiments of a board element configured to be divided into panels.

The separation portion 5b, 5b' may function as a strengthening board area where no cavities 2 are arranged. Alternatively, and as shown in, e.g., FIGS. 4a, 5f-5g and 6a, it may function as a dividing portion DP, DP' of the board element 1. For example, a locking device 6a, 6b may be formed at the separation portion. After dividing the board element, a locking device 6a may be produced at the edge portions $1a'$, $1b'$ of the panels 1' by removing board material 1e, such as by machining. One long edge portion $1a'$ may comprise a strip 6c extending horizontally beyond an upper portion of the panel 1', and a locking element 6d for horizontal locking may be provided thereon. Thereby, panels 1' with edge portions $1a'$, $1b'$ such as those in any of FIGS. 1a-1c or 5b-5e may be obtained. FIGS. 5f-5g and 6a illustrate dividing along long edge portions 1a, 1b, but it is emphasized that similar dividing processes are equally conceivable for dividing the board element 1 and producing a locking device 6b at short edge portions 1c', 1d' of a panel 1', cf. FIGS. 5b-5e. A strip 6c' may extend horizontally beyond an upper portion of the panel 1', and a locking element 6d' for horizontal locking may be provided thereon. In any of these cases, a locking groove 6g, 6g' configured to cooperate with the locking element 6d, 6d' may also be produced.

An impression cycle of the continuous press 13, such as the double-belt press, may be 20-400 seconds, such as 25-220 seconds or 30-180 seconds. Moreover, the act of impressing may comprise applying a pressure of 0.4-5.0 MPa to the substrate portion 3a, such as 0.5-4.0 MPa or 0.6-3.0 MPa. For example, the applied pressure may be 0.7-2.5 MPa, such as 1.0-2.0 MPa.

In some embodiments, and as illustrated in FIGS. 4d and 4f, the substrate 3 may comprise a material buffer 7 located upstream of, and preferably in contact with, the impression device 10, such as when the substrate is continuously displaced towards the pressing area P. For example, the material buffer 7 may be formed by pressing the thermoplastic material 4 vertically downwards and/or upwards by rollers 11a, 11b of the impression device, and thereby the material is pressed backwards (along the feeding direction F). The material buffer 7 may be configured to feed thermoplastic material 4 to the pressing area P. Preferably, a shape of the material buffer 7 varies during the impression cycle. For example, a, preferably maximal, thickness T1' and/or a, preferably maximal, cross-sectional area A of the material buffer 7 may vary. The cross-sectional area A may include the thickness T1' and an upstream width WS1 of the substrate 3. When the impression device 10 comprises rollers 11a, 11b, the thickness T1' may vary with an angular position of the roller 11a, preferably during impression. The thickness variation may be caused by a varying periphery of the impression roller 11a, which deviates from a circular base portion 10c.

The thickness T1' of the material buffer 7 exceeds the gap height G during at least a part of the impression cycle. Moreover the, preferably maximal, thickness T1' may exceed a, preferably maximal, downstream thickness T2 of the substrate 3, which preferably is substantially constant (at locations away from, such as between, the cavities 2). The downstream thickness T2 may exceed the upstream thickness T1 at a location upstream of the material buffer 7 where it preferably is substantially constant, such as 3-10 mm, preferably 3.5-6 mm. Thereby, material may be relocated within the substrate, preferably vertically and/or in a lateral direction LD, LD' and/or along and against the feeding direction F, and an increased substrate thickness may be obtained after the impression device 10. For example, T1' may exceed 3.5 mm, such as being 4-15 mm, and T2 may be 3.5-12 mm, preferably 4-8 mm.

In FIG. 4f an increased amount of thermoplastic material 4 may be needed for creating cavities 2 in the substrate 3 that are separated by a separation portion 5b and/or 5b'. Indeed, the blank portion 10e gives rise to an increased pressing volume between the impression member 10a and the mating member 10b, for example as compared to an impression member 10a without a blank portion 10e. For example, the buffer thickness T1' may temporarily decrease, or sometimes even disappear, e.g., as compared to the upstream thickness T1, when the blank portion 10e faces the mating member 10b during rotation of the impression member 10a. Therefore, a larger material buffer 7 may be needed, at least intermittently. In some embodiments, an upstream feeding speed US of the substrate 3 may have to exceed a downstream feeding speed DS of the substrate, continuously or intermittently, to be able to feed enough material 4, although this is not always needed.

In some embodiments, and as illustrated in FIGS. 4c and 4e, the downstream thickness T2 of the substrate 3 does not exceed the upstream thickness T1 of the substrate 3, which preferably is substantially constant. Preferably, T2 is smaller than T1. For example, T1 may be 3.2-11 mm, preferably 4-7 mm and T2 may be 3-10 mm, preferably 3.5-6 mm. Thereby, parts of the thermoplastic material 4 of the substrate 3 may be relocated when creating the cavities 2, such as vertically and/or in a lateral direction LD, LD' and/or along and against the feeding direction F. The upstream width WS1 of the substrate may thereby increase during the impression to obtain a larger downstream width WS2. This is illustrated in FIGS. 4a-4b, where an excess portion 3e of the substrate 3 or board element 1 formed by the relocated material is shown before and after its removal. It is noted that more material is displaced laterally at the locations of the cavities 2, thereby giving rise to undulating edge portions 3d along the feeding direction F. As shown in FIG. 4a, a width WR of the impression roller 11a and mating roller 11b may exceed the upstream width WS1 of the substrate 3.

In fact, the process herein may further comprise cutting the edge portions 3d of the substrate 3 or board element 1 such that a trimmed downstream width WS2' becomes smaller than the upstream width WS1 and/or downstream width WS2. The cut may be implemented by a cutting unit 51, for example in the form of cutting blades or knives, or by the board dividing device 21a. For example, a crude width approximating a final width of the substrate or board element may thereby be provided. Optionally, the removed material may be recycled and reused in the substrate forming arrangement 16.

In some embodiments, it may be needed to adjust the upstream thickness T1, T1' such that it exceeds the gap height G and/or to regulate the upstream feeding speed US such that it becomes larger than the downstream feeding speed DS. For example, the thickness T1, T1' may be adjusted in the substrate forming arrangement 16 and the speeds US, DS may be regulated by controlling the feeding speed of the substrate forming arrangement 16 and/or an operational speed of the impression device, such as a rotational speed of the rollers 11 thereof.

In some embodiments, the creation of cavities 2 may comprise relocating thermoplastic material 4 of an upstream substrate section 3f in a lateral direction LD, LD', such that the downstream width WS2 increases by at least 2%, preferably at least 5%, more preferably at least 10%. As shown in FIGS. 2f-2g, 3a-3c and 3e, and discussed above, the impression elements 9 may in some embodiments be shaped such that a flow of the thermoplastic material 4 is at least partially directed in the lateral direction LD, LD'.

The creation of the cavities may also comprise relocating thermoplastic material 4 along and against the feeding direction F as well as vertically, such as upwards and/or downwards. For example, the downstream thickness WS2 may increase by at 2%, preferably at least 5%, more preferably at least 10%, as compared to the upstream thickness WS1.

Optionally, a cavity region 2e of the board element 1 or the substrate 3, preferably the rear side 3b, 5, may be cooled (Box 35) during and/or after creating the cavities 2. The cooling may be made by means of the cooling unit 15. The cavity region 2e may be cooled to a cooling temperature Tc below the elevated temperature TS. Embodiments and examples of such cooling have been described page 27, lines 9-20 in WO 2023/249536 A1 which content hereby is explicitly incorporated by reference.

An extrudate from the (co-)extruder 16*a* may be calendered by means of the roller assembly 16*b* before and/or after creating the cavity region 2*e*. Optionally, the extrudate may be calendered after the cooling (Box 35) described above. Preferably, the cavity region 2*e* is supported by support elements 40 of a roller during the calendering, see, e.g., FIGS. 1*a* and 7*a*; also see FIG. 1*a* and page 20, line 17 to page 21, line 9 and FIGS. 1a-1c, 2a-2b and 6a-6h in WO 2023/249536 A1 which hereby is expressly incorporated by reference.

The board element 1 herein may be provided in the form of a panel 1' or may dividable into at least one panel 1', such as at least two panels, wherein each panel is a building panel, floor panel, wall panel, ceiling panel or furniture component. In fact, embodiments of the process disclosed herein (Box 36 and 38) may further comprise dividing the board element 1 into at least one panel, such as at least two panels 1', by the board dividing device 21*a*. For example, the board element 1 may be divided at a dividing portion DP into board members 1" by a first dividing unit 21*a*', which in turn may be further divided into at least two panels 1' by a second dividing unit 21*a*" at a dividing portion DP', wherein the panels preferably are divided into a substantially final format. Preferably, the board element 1 is divided into board members 1" at a dividing portion DP in the form of a separation portion 5*b* (Box 36), cf. FIGS. 4*a*, 5*f*-5*g* and 6*a*. In addition, the board member 1" preferably is divided into panels 1' at a dividing portion DP' in the form of a separation portion 5*b*' (Box 38), cf. FIG. 4*a*. Any dividing disclosed herein may be implemented by machining, such as by using knives, rotating cutting tools, and similarly.

Optionally, the process may comprise attaching a décor structure 8*b*, such as a decorative layer 8*c*, such as a print layer comprising a print P', and/or a wear layer 8*d*, to the board element 1 after or during its forming, preferably by means of the top layer roller arrangement 22. The décor structure 8*b* may be attached, such as laminated or adhered, to the front side 3*c* of the substrate 3 or core 8*a*. Alternatively, the print P' may be printed digitally, as described above.

Generally herein, at least a portion of the substrate 3 comprising the décor structure 8*b* may be embossed by means of a roller comprising an engraving 41 (see, e.g., FIG. 7*a*) or by means of a digital embossing device 42. Thereby, an embossed structure 3*g*, preferably in register with the print P', may be obtained, in a front side 3*c* of the substrate 3 or core 8*a*, such as in a décor structure 8*b* thereof. The décor structure 8*b* may be a decorative layer 8*c*, such as a print layer, and/or a wear layer 8*d*.

A circumference C of the impression roller 11*a* may essentially correspond to a multiple or a fraction of a board extension EB along the feeding direction F, such as a length or a width, of the board element 1. For example, a quotient Q=C/EB may essentially be a positive integer, such as 1, 2, 3, . . . , or a positive rational number, such as ½, ⅓, ¼, . . . or 3/2, 5/2, . . . , etc. Preferably, a number N of, preferably equally interspaced, blank portions 10*e*, is positive integer, such as 1, 2, 3, . . . .

In some embodiments, the arrangement 20 may further comprise an annealing unit 21*c*, preferably arranged after at least part of the board dividing device 21*a* and before the profiling unit 21*b*, see, e.g., FIG. 1*a*. In a non-restrictive example, the annealing unit 21*c* may be arranged after the first dividing unit 21*a*' and before the second dividing unit

21*a*". When the cavity region 2*e* is cooled (Box 35), the annealing preferably is performed after the cooling.

The annealing (Box 37) may comprise heating the board element 1 or board member 1" to an annealing temperature of 80-170° C., such as 120-145° C., such as 130-140° C., preferably when the thermoplastic material 4 comprises PVC and a filler 4*b*, such as an inorganic filler. By way of example, the annealing unit 21*c* may comprise at least one of a heat oven, a hot-air heater, and a heat bath comprising a fluid, such as water.

A board element 1 or panel 1' obtainable by the process described herein, such as in FIGS. 1*a*-1*c*, 4*a*-4*b*, 5*a*-5*g*, 6*a* and 7*a*, may comprise at least one layer 8 comprising a thermoplastic material 4. Features and characteristics appertaining thereto have been described page 30, line 12 to page 31, line 2 and, e.g., FIGS. 7a-7e in WO 2023/249536 A1 which content hereby is explicitly incorporated by reference. Moreover, in any of the embodiments of the substrate 3 or board element 1 or panel 1' herein, such as in FIGS. 1*a*-1*c*, 4*a*-4*b*, 5*a*-5*g*, 6*a* and 7*a*, a surface of an inner portion 2*f* of the cavities 2 may be closed. The concept of being "closed" is described on page 31, line 20 to page 32, line 2 in WO 2023/249536 A1 which content hereby is explicitly incorporated by reference.

In some embodiments, and as shown, e.g., in FIGS. 4*a*-4*b*, 5*a*-5*g* and 6*a*, the cavities 2 may be provided in an interior 5*a* of the rear side 5, whereby they are spaced from a pair of opposite long edge portions 1*a*, 1*b* and/or from a pair of opposite short edge portions 1*c*, 1*d* (or 1*a*', 1*b*' and/or 1*c*', 1*d*' in the case of a panel 1'). This may be implemented by the space 10*f*'. Optionally, they are spaced from all edge portions 1*a*', 1*b*', 1*c*', 1*d*' of the panel 1'. The cavities 2 may be provided inside of the locking device(s) 6*a* and/or 6*b*. For example, the cavities 2 may be provided inside of horizontally innermost portions 6*e*, 6*f* of the locking device(s) 6*a* and/or 6*b*.

In preferred embodiments, a longitudinal LE and a perpendicular transverse extension TE of the cavities 2 and/or extensions M1, M2 along a pair of non-parallel, such as perpendicular, horizontal directions D1, D2 may be substantially the same, cf. FIGS. 3*d* and 5*b*-5*e*, but also FIGS. 3*e*, 4*a*-4*b* and 5*f*-5*g*. In a first non-limiting example, LE and/or TE (or M1 and/or M2) may be 5-20 mm, preferably 8-15 mm. In a second non-limiting example, LE and/or TE (or M1 and/or M2) may be 0.5-5 mm, preferably 1-3 mm. In some embodiments, however, the impressed cavities 2 may be elongated, whereby the longitudinal extension LE exceeds the transverse extension TE, e.g., as disclosed in FIGS. 4*e*-4*f* and 8*c*-8*h* and on page 32, line 17 to page 33, line 8 of WO 2023/249536 A1 which content hereby is explicitly incorporated by reference. In a non-limiting examp3e, TE may be 1-6 mm, preferably 2-4 mm.

The substrate 3 or board element 1, such as the board member 1" or panel 1', herein may have a, preferably maximal, thickness T of 3-10 mm, such as 4-7 mm. Preferably, the thickness T is determined without the inclusion of an underlay element, such as a foam. Typically, the downstream width WS2 of the board element 1 may be 800-2000 mm, preferably 1000-1600 mm, more preferably 1200-1400 mm, and/or a width W of the panel 1' may be 80-600 mm, preferably 100-400 mm, more preferably 120-300 mm, although these are examples are non-restrictive.

Aspects of the disclosure have mainly been described above with reference to a few embodiments. However, as is readily appreciated by a person skilled in the art, other embodiments than the ones disclosed above are equally possible within the scope of the disclosure. For example, a skilled artisan will appreciate that the embodiment in FIG. 4*a* may comprise a roller assembly 16*b* analogously to that in FIG. 1*a* or 7*a*. Additionally, it is understood that, e.g., FIGS. 4*c*-4*f* are schematic and that the substrate 3 may be guided along subsequent rollers or similar guiding elements, e.g., as in FIG. 1*a* or 7*a*. Finally, it is stressed that the blank portion 10*e* and/or 10*f* may in some embodiments optionally comprise embossing elements 10*h*, preferably being smaller than the impression elements 9, such as being 50%, preferably 70%, more preferably 90% smaller than the impression elements in height HS and/or extension, preferably in the horizontal directions E1, E2, see FIG. 2*a*. Such embossing elements 10*h* would give rise to an embossing structure 2*p* in the separation portion 5*b* and/or 5*b*', preferably being smaller than the cavities 2, such as being 50%, preferably 70%, more preferably 90% smaller than the cavities in height DC and/or extension, preferably in the horizontal directions D1, D2 or in the extensions TE, LE, see FIG. 5*e*.

The invention claimed is:

1. A process for manufacturing a board element comprising a plurality of cavities in a rear side of the board element, wherein the process comprises:
    displacing a substrate comprising a thermoplastic material in a feeding direction towards a pressing area of an impression device comprising a plurality of protruding impression elements;
    creating said cavities in a rear side of the substrate by impressing a substrate portion of the substrate in the pressing area by the impression device; and
    obtaining said board element, a depth of the cavities being at least 0.10 of a thickness of the substrate and/or of the board element,
    wherein an upstream thickness of the substrate upstream of the impression device exceeds a gap height of said pressing area during at least a part of an impression cycle, wherein the upstream thickness of the substrate is substantially constant,
    wherein the impression device comprises at least one roller comprising said impression elements, and
    wherein the impression elements are rigid.

2. The process according to claim 1, wherein the rigid impression elements comprise a metal-based material.

3. The process according to claim 1, wherein the rigid impression elements comprise a nonmetallic inorganic material having a modulus of elasticity exceeding 30 GPa, or a polymer-based material having a modulus of elasticity exceeding 3 GPa.

4. The process according to claim 1, wherein the substrate comprises a material buffer upstream of the impression device, the material buffer being configured to feed thermoplastic material to said pressing area.

5. The process according to claim 4, wherein a thickness of the material buffer exceeds a downstream thickness of the substrate.

6. The process according to claim 1, wherein said at least one roller comprises a rigid roller comprising the rigid impression elements.

7. The process according to claim 1, wherein the rigid impression elements are provided on a separate lining member arranged on a roller.

8. The process according to claim 7, wherein the separate lining member is arranged around an entire perimeter of the roller.

9. The process according to claim 1, wherein all of the impression elements of one of the at least one roller are rotationally fixed to the one of the at least one roller during operation of the one of the at least one roller.

10. The process according to claim 1, wherein a width of the at least one roller exceeds an upstream width of the substrate.

11. The process according to claim 1, wherein the impression device comprises an impression press plate provided with a structured surface comprising said impression elements.

12. The process according to claim 1, wherein a downstream thickness of the substrate does not exceed the upstream thickness of the substrate.

13. The process according to claim 1, further comprising forming the substrate under heat by extrusion of an extrudate, and calendering the extrudate from an extruder by at least three rollers.

14. The process according to claim 1, further comprising attaching a décor structure to the board element after or during its forming.

15. The process according to claim 1, wherein said creating comprises relocating thermoplastic material of an upstream substrate section in a lateral direction, such that a downstream width of the substrate increases by at least 2%.

16. The process according to claim 1, wherein the impression elements are shaped such that a flow of the thermoplastic material is at least partially directed in a lateral direction.

17. The process according to claim 1, wherein the impression elements each comprise an inclined or curved distal wall for at least partially directing a flow of the thermoplastic material in a lateral direction and/or wherein the impression elements each have a first boundary portion shaped for at least partially directing a flow of the thermoplastic material in a lateral direction, and optionally a second boundary portion for reducing a flow of the thermoplastic material in an opposing lateral direction.

18. The process according to claim 1, wherein a first and a second set of impression elements are separated from each other along a separation direction by a blank portion, a distance between the impression elements along the separation direction between the first and the second sets being larger than a distance between the impression elements within each of the first and the second sets.

19. The process according to claim 1, wherein the substrate upstream of the impression device is provided in the form of a sheet having a substantially constant cross-section.

20. A process for manufacturing a board element comprising a plurality of cavities in a rear side of the board element, wherein the process comprises:
    displacing a substrate comprising a thermoplastic material in a feeding direction towards a pressing area of an impression device comprising a plurality of protruding impression elements;
    creating said cavities in a rear side of the substrate by impressing a substrate portion of the substrate in the pressing area by the impression device; and
    obtaining said board element, a depth of the cavities being at least 0.10 of a thickness of the substrate and/or of the board element,
    wherein an upstream thickness of the substrate upstream of the impression device exceeds a gap height of said pressing area during at least a part of an impression cycle,
    wherein the impression device comprises at least one roller comprising said impression elements,
    wherein the impression elements are rigid, and wherein a downstream thickness of the substrate exceeds the upstream thickness of the substrate.

* * * * *